Figure 1:
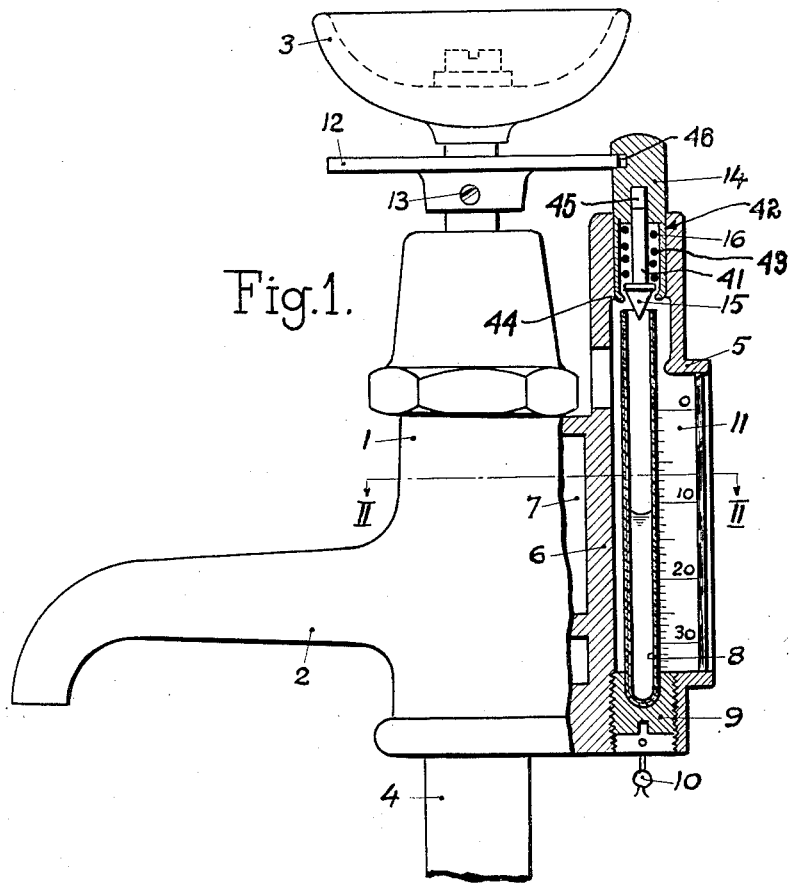

Feb. 8, 1938.   O. T. CLORIUS   2,107,628
EVAPORATION METER
Filed Sept. 25, 1936   2 Sheets-Sheet 1

INVENTOR:
ODIN THORVALD CLORIUS
BY: Francis E. Boyce
ATTORNEY

Feb. 8, 1938.   O. T. CLORIUS   2,107,628
EVAPORATION METER
Filed Sept. 25, 1936   2 Sheets-Sheet 2
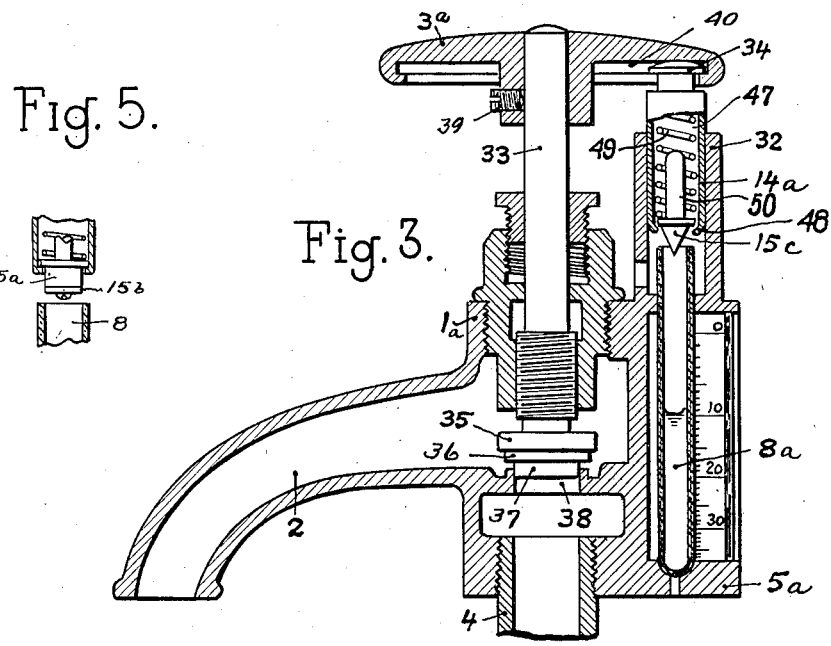
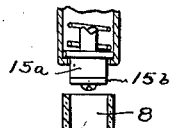
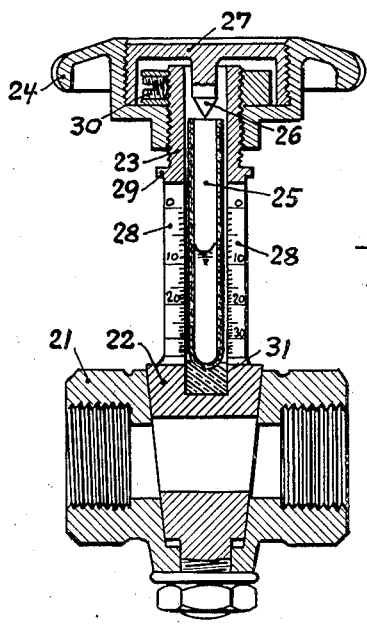
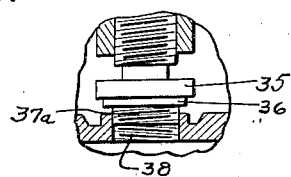
INVENTOR:
ODIN THORVALD CLORIUS
BY: Francis E. Boyce
ATTORNEY Patented Feb. 8, 1938

2,107,628

UNITED STATES PATENT OFFICE 2,107,628

EVAPORATION METER

Odin Thorvald Clorius, Copenhagen, Denmark

Application September 25, 1936, Serial No. 102,618
In Denmark October 8, 1935

16 Claims. (Cl. 73—193)

The invention relates to an evaporation meter, and can be used for measuring the quantity of fluid substance or heat energy of any kind that in some way or other is conveyed through a conduit fitted with a closing member, or for measuring the time during which the closing member, for instance a valve, is standing open, and thereby a measure will be given indirectly for the quantity of substance, for instance water, gas etc., passing through the conduit, or the heat of a fluid passing through such conduit provided that always mainly the same quantity of fluid is or heat units are flowing through the conduit per unit of time.

The evaporation meter according to the invention is fitted with a closing member which by mechanical means is coupled in such a manner to the closing member of a conduit that the latter closing member, during its opening motion, also opens the measuring vessel of the evaporation meter and, during the closure, closes the same. The opening is effected at the start of the opening motion, and the closure is effected towards the finish of the closing motion. By a preferable construction of the invention, the measuring member is opened fully during the opening motion, before the closing member opens for the passage of the medium concerned.

Evaporation meters are used for instance for caloriferes, and are then disposed in a casing clamped to the surface of the calorifere, or for hot-water conduits, and are then disposed in a casing on the conduit. The casing becomes hot and cold together with the calorifere or, respectively, the conduit. Especially in the latter case this is a great drawback, as by the tapping the pipe lines become hot, and only slowly are cooled, for instance during the course of about an hour. Consequently, the measure indicating the consumption of hot water will be mainly the same, whether the tapping has lasted a quarter of a minute or five minutes. For hot-water cocks that during the course of a year are opened and closed innumerable times for short periods, this circumstance means a considerable source of error.

This drawback is remedied by the invention in that the measuring member, as mentioned above, is opened and closed simultaneously, or nearly simultaneously, with the opening and closure of the supply of medium. If the valve is open only for a short time, also the measuring member will only be open for a short period.

Figure 2:
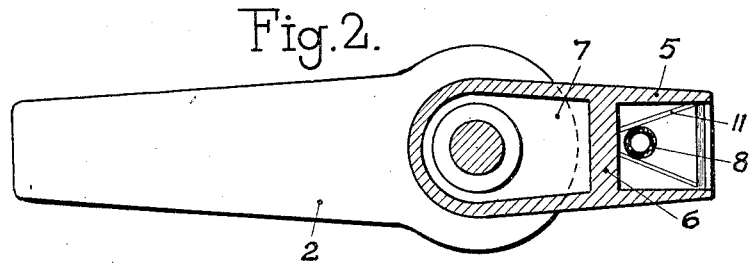

A few embodiments of the invention are illustrated by way of example on the drawings, in which:

Fig. 1 is a side elevation, partly in section, showing a hot-water valve with an evaporation-measuring device cast integrally with the valve casing, Fig. 2 a horizontal section along the line II—II in Fig. 1, Figs. 3 and 4 are vertical median sections of other embodiments of the invention, Fig. 5 is a detail showing a slight modification of the valve shown in Fig. 1; and Fig. 6 shows a modification of the main valve of Fig. 3.

In Fig. 1, 1 is a hot-water valve body connected to a hot-water pipe and fitted with an outlet nipple 2 and hand wheel 3.

The valve body 1 is cast integrally with an evaporation-meter frame 5, the rear wall 6 of which forms, at the same time, the wall of the water space 7 in the valve body 1.

The evaporation meter is of a nature known per se, and consists of a measuring glass 8 which is filled with liquid, and by means of an adjusting screw 9 can be adjusted in the meter frame 5, and is fitted with a scale 11 extending along the measuring glass 8. A sealing wire and seal 10 are used to prevent unauthorized access to the screw 9.

On the spindle of the hand wheel 3, a circular disc 12 with set screw 13 is provided. Normally the open upper end of the measuring glass 8 is closed by a cone valve 15 having an upstanding stem 41. The upper part of the frame 5 is provided with a cylindrical bore 42 wherein is slidably fitted a plunger or spindle 14 having an axial recess 43 in its lower end of proper diameter to receive the base of the cone valve 15. The lower end of the plunger or spindle is provided with an inturned peripheral lip 44 so as to form a restricted opening through which the base of the valve 15 cannot pass. At the upper end of the bore 42 there is an axial recess 45 to receive the upper end of the valve stem 41. A spring 16 surrounds the stem 41 in the bore 42 and urges the valve 15 downwardly. The plunger 14 projects upwardly and has a lateral notch 46 receiving the peripheral portion of the disc 12. When the valve is manipulated, the disc 12 will move up and down together with the hand wheel 3, and thereby simultaneously the spindle 14, with the valve cone 15 which covers the opening of the measuring glass, will partake in the upward and downward motion. When the valve is opened wholly or partly, the evaporation from the measuring vessel will consequently be able to take place simultaneously, without any hindrance. When the valve is closed entirely, the evaporation is thereby also caused to cease. The function of the evaporation meter in respect to the length of the active period as well as in respect to the effectivity is thus dependent on the manipulation of the valve.

The valve cone 15 can be pressed up into the hollow spindle 14 but is, however, urged into closed position by a spring 16, for the purpose of preventing the measuring glass from being crushed owing to a false adjustment of the circular disc 12, when the hand wheel 3 is screwed firmly home, in order to close the valve.

When the top of the evaporation-meter tube is opened, the evaporation meter will act as an ordinary evaporation meter, viz. so that a quantity of fluid corresponding to the temperature of the water flowing through the valve body will evaporate.

In the drawings, the valve 15 is a ground metal plug, but it may also be a plane valve 15a, and be fitted with a soft packing 15b.

The closing members of valves or cocks will alter their shape during use, by becoming ground together, pressed together etc. or they may even be replaced by new ones, and consequently during the use of the plant the closing and opening of the evaporating medium, for instance the water, will very soon fail to take place at exactly the same position of the hand wheel or handle as when the plant was new. Consequently, the opening and closing of the heating medium will not afterwards be effected simultaneously with the evaporation meter being brought into or out of operation. According to the invention, this drawback can be removed by taking the precaution that during the initial motion of the main valve the closing member serving to open the heat meter, is opened, so that the latter at once enters into operation, while on the other hand the heating medium valve is either not at all opened and, vice versa, at the closure, the heat meter is the last one to be cut out of operation.

Fig. 3 shows an embodiment in which a hot-water valve with soft valve packing serves as a valve member, and in which the evaporation meter is disposed on the side of the valve body.

In Fig. 3, 1a indicates a valve casing containing a valve such as is shown in Fig. 1 and connected with a supply pipe 4 and a valve spindle 33 provided with a hand wheel 3a and valve head 35 with soft packing 36, below which a short cylindrical plug 37 is disposed which fits closely in the hole 38 of the valve seat. If desired the plug 37 may be fitted with screw threads 37a as in Fig. 6. On the side, the valve body is cast together with a frame or case 5a for the evaporation meter which consists of an evaporation tube 8a partly filled with liquid. The evaporation tube 8a is a glass tube open at the top, and can be closed by means of a small valve plug 15c disposed in a spring casing 14a which is guided in the top part 32 of the evaporation-meter frame 5a. The spring casing 14a is provided with a downwardly opening bore 47 and has an inturned lip 48 as in the form shown in Fig. 1. A spring 49 surrounds the stem 50 of the valve 15c in the bore 47 and urges the valve downwardly. The spring casing 14a is fitted at the top with a button 34 engaging an annular slot 40 below the umbrella-shaped hand wheel 3a, which latter can be clamped into position and adjusted by means of a screw 39.

When the valve is opened by screwing the hand-wheel spindle 33 upward, the passage in the seat hole 38 will be stopped by the short plug 37 on the valve head 35 during the first part of the said upward motion, but on the other hand the free evaporation of the meter liquid will be established, during the same part of the spindle motion, owing to the manipulation of the hand wheel 3a which is connected to the valve cone 15 of the spring casing 14a. By continuation of the upward screwing motion of the valve spindle 33, the passage for the hot water will gradually become free.

The soft packing 36 of the valve head 35 will be compressed during use, owing to the firm pressure exerted thereon by means of the hand wheel. Thereby the valve spindle is lowered, and by means of the spindle 33 and the hand wheel 3a the valve 15 will be lifted slightly into the spring casing 14a. Consequently, at the beginning of the upward motion of the valve spindle 33, the valve cone 15c will still continue to close the evaporation tube 8a, but at the same time the plug 37 will close the seat hole 38, although not quite tightly. Before the free passage through the seat hole 38 has been established, the valve cone 15c will have opened for free evaporation of the meter fluid.

Fig. 4 shows an embodiment in which the valve member is a cock, and the evaporation meter is disposed in the interior of the cock-plug spindle.

In Fig. 4, 21 indicates a cock body, 22 a cock cone with spindle 23 and hand wheel 24. The spindle 23 is hollow, and in the cavity thereof the glass tube 25 of the evaporation meter is disposed, and is closed by means of a valve plug 26 attached to a flanged plate 27 which is screwed into the hub of the hand wheel 24. The spindle 23 is not only hollow but has also two open slots with scales 28. The hand wheel is mounted as a threaded nut on the upper end of the rotary threaded spindle 23. The motion up and down of the latter is limited by the shoulder 29 and the nut 30. A caoutchouc or cork plug 31 prevents the glass tube from breaking if, during the closing process, the valve plug 26 is pressed downward too forcefully. In this form the valve 26 will open before the valve 22 and the former will close before the latter.

By the construction shown by way of example in Fig. 4, the advantage is attained that when the cock is being opened, the heat meter is set into operation, even before the flow takes place, as at the opening motion the threaded hand wheel will rotate about the cock spindle and, by its upward motion will lift the valve cone 26 from the orifice of the glass tube 25, some time before the tightly fitting cock cone commences to rotate and, thereby, offers free passage for the water.

The distinguishing feature of the invention is that means are provided for bringing the evaporation meter into operation, before the supply of heating medium is opened.

In the above description, only the opening motion is referred to, but in a corresponding manner, the operation of the evaporation meter is caused to cease simultaneously with or directly after the closure of the supply of heating medium.

Instead of the evaporation meter shown, also other evaporation meters may be used.

The device according to the invention may be connected to closing members of any nature, for instance to closing members for pipes for hot and cold water, or for steam, gas, etc. What is measured is a product of the time and the temperature.

When the temperature is mainly constant, as in the case of the ordinary supply lines for coldwater, gas and other fluid, simply the time during which the supply is open will be measured.

Having thus described my invention, what I claim is:—

1. The combination with a main flow controlling valve, of an evaporation meter having a container for an evaporation liquid and valve means for opening and closing said container, and an operative connection between said main valve and the valve means of the meter for opening and closing the container as the main valve is opened and closed.

2. The combination with a main flow controlling valve, of an evaporation meter having a container for an evaporation liquid and valve means for opening and closing said container, and an operative connection between said main valve and the valve means of the meter for opening the container prior to the opening of the main valve and closing said container subsequent to the closing of the main valve.

3. The combination with a main flow controlling valve including a valve body and a movable valve actuating member, of an evaporation meter having a container for evaporation liquid and a valve for opening and closing said container, said meter being carried by said main valve body, and an operative connection between the main valve actuating member and the valve of the meter whereby movement of said actuating member in a given direction effects corresponding movements of the main and meter valves.

4. The combination with a main flow controlling valve including a valve body and a vertically movable valve actuating member, of an evaporation meter carried by said valve body and including a container for evaporative liquid open at its top and a vertically movable valve above said container for opening and closing said top, and an operative connection between said valve actuating member and the meter valve.

5. The combination with a main flow controlling valve including a valve body and a valve stem controlling the opening and closing of the valve, of an evaporation meter carried by said valve body and including a container for evaporative liquid open at its top and a vertically movable valve above said container for opening and closing said top, and an operative connection between said valve stem and the meter valve and including a lost motion device permitting opening of the main valve subsequent to the opening of the meter valve and closing of the meter valve subsequent to the closing of the main valve.

6. The combination with a main flow controlling valve including a valve body and a vertically movable valve actuating member, of an evaporation meter carried by said valve body and including a container for evaporative liquid open at its top and a vertically movable valve above said container for opening and closing said top, and an operative connection between said valve actuating member and the meter valve, said connection including a spring urging said meter valve downwardly whereby the meter valve remains closed during initial opening movement of the main valve and closes prior to final closing movement of said main valve.

7. The combination with a main flow controlling valve including a valve body and a vertically movable valve actuating member, of an evaporation meter carried by said valve body and including a container for evaporative liquid open at its top and a vertically movable valve above said container for opening and closing said top, an operative connection between said valve actuating member and the meter valve, and movable means supporting said container in adjusted relation to the meter valve.

8. The combination with a main flow controlling valve including a valve body and a valve stem controlling the opening and closing of the valve, of an evaporation meter carried by said valve body and including a container for evaporative liquid open at its top and a vertically movable valve above said container for opening and closing said top, an operative connection between said valve stem and the meter valve and including a lost motion device permitting opening of the main valve subsequent to the meter valve and closing of the meter valve subsequent to the main valve, and movable means supporting said container in adjusted relation to the meter valve.

9. The combination with a main flow controlling valve including a valve body and a vertically movable valve actuating member, of an evaporation meter carried by said valve body and including a container for evaporative liquid open at its top and a vertically movable valve above said container for opening and closing said top, an operative connection between said valve actuating member and the meter valve, said connection including a spring urging said meter valve downwardly whereby the meter valve remains closed during initial opening movement of the main valve and closes prior to final closing movement of said main valve, and movable means supporting said container in adjusted relation to the meter valve.

10. The combination with a main flow controlling valve including a valve body and a vertically movable valve stem controlling the opening and closing of the valve, of an evaporation meter including a frame supported by said valve body and having an opening in its top, a container for evaporative fluid open at its top and supported in the frame in alignment with said opening, a plunger slidable vertically through said opening, and a valve carried by the plunger for opening and closing the container top, and an operative connection between said plunger and the main valve stem whereby movement of the main valve effects corresponding movement of the meter valve.

11. The combination with a main flow controlling valve including a valve body and a vertically movable valve stem controlling the opening and closing of the valve, of an evaporation meter including a frame supported by said valve body and having an opening in its top, a container for evaporative fluid open at its top and supported in the frame in alignment with said opening, a plunger slidable vertically through said opening, said plunger having a bore in its lower end, and a valve carried by the lower end of the plunger for opening and closing the container top, and an operative connection between the plunger and said stem to move the plunger vertically in unison with the vertical movement of the stem.

12. The combination with a main flow controlling valve including a valve body and a vertically movable valve stem controlling the opening and closing of the valve, of an evaporation meter including a frame supported by said valve body and having an opening in its top, a container for evaporative fluid open at its top and supported in the frame in alignment with said opening, a plunger slidable vertically through said opening, and a valve carried by the plunger for opening and closing the container top, an operative connection between said plunger and the main valve stem whereby movement of the main valve effects corresponding movement of the meter valve, and a container supporting and adjusting plug screwed into the bottom of said frame and on which the container rests.

13. The combination with a main flow controlling valve including a valve body and a vertically movable valve stem controlling the opening and closing of the valve, of an evaporation meter including a frame supported by said valve body and having an opening in its top, a container for evaporative fluid open at its top and supported in the frame in alignment with said opening, a plunger slidable vertically through said opening, a valve carried by the plunger for opening and closing the container top, said plunger having a lateral notch on its upper end, and a disc fixed on said stem and having its periphery engaged in said notch.

14. The combination with a main flow controlling valve including a valve body and a vertically movable valve stem controlling the opening and closing of the valve, of an evaporation meter including a frame supported by said valve body and having an opening in its top, a container for evaporative fluid open at its top and supported in the frame in alignment with said opening, a plunger slidable vertically through said opening, a valve carried by the plunger for opening and closing the container top, a head on said plunger, and an actuating wheel on said stem having its peripheral portion overhanging said head, said wheel having a depending peripheral flange provided with an internal annular groove wherein the periphery of the head is engaged.

15. The combination with a main flow controlling valve having a valve body and a rotary type valve seated in said body, of a hollow stem extending upwardly from said valve and having an externally threaded upper end, a container for evaporative fluid held within said stem and open at its top, means to gauge the height of evaporative fluid in said container, a valve operating member screwed on said upper end and movable by screwing movement along said stem, and a valve carried by said member for opening and closing the top of said container.

16. The combination with a main flow controlling valve having a valve body and a rotary type valve seated in said body, of a hollow stem extending upwardly from said valve and having an externally threaded upper end, a container for evaporative fluid held within said stem and open at its top, means to gauge the height of evaporative fluid in said container, a valve operating member screwed on said upper end and movable by screwing movement along said stem, a valve carried by said member for opening and closing the top of said container, and an elastic cushion in the bottom of said hollow stem and on which the container rests.

ODIN THORVALD CLORIUS.